Patented Nov. 26, 1935

2,022,302

UNITED STATES PATENT OFFICE 2,022,302

COATING COMPOSITION AND PROCESS OF PREPARING SAME

Robert L. Sibley, Nitro, W. Va., assignor to The Rubber Service Laboratories Company, Akron, Ohio, a corporation of Ohio No Drawing. Application August 22, 1933, Serial No. 686,318

12 Claims. (Cl. 134—56)

The present invention relates to improvements in coating compositions and to the process of preparing same. More particularly, the present invention relates to coating compositions containing a drying oil and includes as its object the provision of a composition possessing the characteristic property of interrupting or retarding the continued oxidation of oils, paints, varnishes and the like after the said products have reached the desired oxidized condition.

In the manufacture of paints and varnishes including the incorporation of drying oils therein it is usually customary to employ a suitable quantity of an oxidation catalyst to speed up the normal drying rate of the oil so that the composition will dry hard within a reasonable time when it is spread in a thin film over a surface. This positive oxidation catalyst is commonly called a dryer. It is known that the dryers commonly employed induce various oxidation phenomena, some of which are necessary and desirable and some of which are very objectionable from the practical operation standpoint. According to the present invention, the undesirable qualities of the so-called dryers are substantially eliminated by the incorporation in paints, varnishes, oils and the like of a small proportion of a preferred class of oxidation controllers comprising acridine compounds. As specific examples but not limitations of the broad scope of this invention are the following chemical compounds: 2-methyl naphthacridine, pheno-1, 2-naphthacridine, phenyl acridine, meso phenyl-hydro-B-naphthacridine, acridine, 2-methylhydronaphacridine, dihydroacridine, methyl acridine methyl dihydroacridine and benzyl acridine.

As one method of operating the present invention a varnish was prepared by heating seven pounds of tung oil and two pounds of modified phenolic resin to 450° F. for sixty minutes, after which the resulting product was cooled to 420° F. and thinned with one and one-third gallons of mineral spirits. Substantially 20 grams of a lead-cobalt naphthenate dryer was added thereto. The material thus obtained was a very rapid drying varnish which contained substantially 56% of non-volatile matter.

To 100-gram portions of the finished varnish prepared in the manner described, a convenient quantity, for example 0.173 gram of any one or a mixture of two or more of the acridines hereinbefore described may be added and the varnish so treated tested in the following manner. Thus, portions of the treated varnishes are incorporated on clean black iron panels in a convenient manner, as for example by flowing thereon. Portions of the untreated varnish are also incorporated on identical iron panels for purposes of comparison. The panels prepared in the manner described are exposed to the sun's rays in the open atmosphere and sprayed daily with water. Frequent examinations are made of the test panels, and at the end of a convenient period of time, for example nine weeks and longer, comparisons are made between those strips coated with the varnish containing one of the preferred oxidation controllers and the strips coated with the varnish containing no oxidation controller. Tests carried out in the manner hereinbefore described demonstrate the efficiency of the preferred class of materials in preventing weathering, undue oxidation and the like of the varnish in which they are incorporated. Furthermore, analogs, homologues and derivatives of the acridines set forth in the above tests may be employed as oxidation controllers in paints, varnishes and the like.

It is thus evident from the above tests that the invention herein set forth comprises an important advance in the art of varnish, oil and paint manufacture.

It is obvious that the process and compositions described herein may be varied widely in their details without departing from the spirit or scope of the present invention. These possible variations will be apparent to those skilled in the art and the present invention is not limited to the specific details mentioned, except as described in the appended claims.

What is claimed is:

1. A coating composition containing a drying oil having incorporated therein a controller of oxidation thereof comprising a hydroacridine.

2. A coating composition containing a drying oil having incorporated therein a controller of oxidation thereof comprising an alkyl substituted hydroacridine.

3. A coating composition containing a drying oil having incorporated therein a controller of oxidation thereof comprising dihydroacridine.

4. A coating composition containing a drying oil having incorporated therein a controller of oxidation thereof comprising a methyl dihydroacridine.

5. The improvement in the manufacture of coating compositions which comprises mixing the composition containing a drying oil with a controller of oxidation thereof comprising a hydroacridine.

6. The improvement in the manufacture of coating compositions which comprises mixing the composition containing a drying oil with a controller of oxidation thereof comprising an alkyl substituted hydroacridine.

7. The improvement in the manufacture of coating compositions which comprises mixing the composition containing a drying oil with a controller of oxidation thereof comprising dihydroacridine.

8. The improvement in the manufacture of coating compositions which comprises mixing the composition containing a drying oil with a controller of oxidation thereof comprising methyl dihydroacridine.

9. A coating composition containing a drying oil characterized by incorporating therein a positive oxidation catalyst and a controller of oxidation thereof comprising a hydroacridine.

10. A coating composition containing a drying oil characterized by incorporating therein a positive oxidation catalyst and a controller of oxidation thereof comprising an alkyl substituted hydroacridine.

11. A coating composition containing a drying oil characterized by incorporating therein a positive oxidation catalyst and a controller of oxidation thereof comprising dihydroacridine.

12. A coating composition containing a drying oil characterized by incorporating therein a positive oxidation catalyst and a controller of oxidation thereof comprising methyl dihydroacridine.

ROBERT L. SIBLEY.